Sept. 22, 1970    R. E. WAYNE    3,529,732
ARTICLE TRANSFER APPARATUS
Filed April 24, 1968    5 Sheets-Sheet 1

Fig. 1

Inventor
Ronald E. Wayne
By John K. Crump
Attorney

Sept. 22, 1970     R. E. WAYNE     3,529,732
ARTICLE TRANSFER APPARATUS Filed April 24, 1968     5 Sheets-Sheet 2

Inventor
Ronald E. Wayne
By John K. Crump
Attorney

Inventor
Ronald E. Wayne
By John K. Crump
Attorney

Sept. 22, 1970           R. E. WAYNE           3,529,732

ARTICLE TRANSFER APPARATUS

Filed April 24, 1968           5 Sheets-Sheet 5

Inventor
Ronald E. Wayne
By John K. Crump
Attorney

United States Patent Office 3,529,732
Patented Sept. 22, 1970

3,529,732
ARTICLE TRANSFER APPARATUS
Ronald E. Wayne, Butler, Wis., assignor to "Automatic" Sprinkler Corporation of America, Cleveland, Ohio, a corporation of Ohio
Filed Apr. 24, 1968, Ser. No. 723,774
Int. Cl. B65g 57/24
U.S. Cl. 214—6
6 Claims

ABSTRACT OF THE DISCLOSURE

A continuous, vertical conveyor mechanism for transferring articles from one elevation to another where one elevation is fixed and the other is variable, comprising independent pairs of endless, flexible chains supporting a number of one-way flexible support aprons for movement in closed paths of travel and movable at times in vertical, parallel planes with one another with the aprons in a horizontal, rigid or load-carrying position between the chains and at other times in coincident planes with the aprons in a non-load carrying, folded position between and in the same plane as the chains, and a vertically movable carriage mechanism disposed in the vertical travel path of the chains for varying the elevational position at which the chains commence or terminate travel in vertical, parallel planes, depending upon the direction of movement of the chains through the carriage, whereby to corspondingly vary the vertical position at which the aprons move into or out of a rigid, load carrying position relative to the chains during movement through the closed travel paths. The articles which are to be handled in the conveyor are loaded onto the aprons as the latter are moved by the chains into a rigid, horizontal position between the chains and, following vertical movement to the desired elevation, are removed from the aprons concurrently as the latter move into a non-load carrying, folded position between the chains.

---

The carriage in addition to providing for the varying of the elevational position at or to which the articles are received or delivered includes in one form of the invention stripping means for automatically removing articles from the aprons as the latter move through the carriage at the desired discharge elevation while, in another form of the invention, the carriage includes pick-up means for automatically loading articles onto the aprons as the latter pass therethrough at the desired infeed elevation.

This invention relates to a continuous vertical conveyor for articles such as cases, cartons, boxes, crates, packages, etc. The present invention more particularly concerns a continuous vertical conveyor which embodies means for selectively varying the elevational position at which the articles being handled therein are received by or discharged from the conveyor. While susceptible of application to a wide range of article transfer operations apparatus of the invention is particularly suited to effect the automatic, high speed palletizing or depalletizing of articles of the general character mentioned.

In conveyor mechanisms of the general type with which the invention is concerned, separate pairs of endless chain means operate in synchronous relation to one another in closed paths of travel to cycle, on a continuous or uninterrupted basis, a series of one-way flexible or foldable support aprons from an infeed station to receive one or more of the articles which are to be transferred to a discharge station where the articles are removed from the aprons, and then back to the infeed station via a different path of travel to receive another charge of the articles being handled in the conveyor. As an example of such a vertical conveyor mechanism reference is made to U.S. Pat. No. 3,024,891, issued to H. M. Sawrie, Mar. 13, 1962, entitled "Continuous Vertical Lift."

Referring to this patent, it will be noted that the chain pairs travel in vertical, parallel paths between the article infeed and discharge elevations with the aprons extending horizontally and rigidly between the chains in such portion of their travel. At the discharge elevation, the chain pairs are afforded successive 90° turns and commence to travel in coincident planes with one another in first a horizontal direction relatively toward a receiving platform and then vertically downwardly in a plane adjacent the inner end of the platform. The aprons, in the course of moving with the chains in this portion of their travel, pass horizontally toward and then fold downwardly in front of the receiver platform whereby to cause the articles supported on the apron to pass directly onto the receiver platform. The chain pairs move in coincident planes with one another during return to the infeed elevation with the aprons lying between and in the same plane as the chains during this return movement. At the infeed station, the chains pairs are again afforded successive 90° turns to initially cause the chains to move horizontally and then vertically, concurrently as they pass from movement in coincident planes to movement in spaced, parallel planes. The aprons in the course of moving with the chains in this portion of their travel pass initially into a horizontal, rigid position between the chains to receive a charge of the articles from the infeed station and then commence vertical upward travel as aforesaid while in a horizontal, rigid position between the chains.

This general type of conveyor, among other advantages and features, has the capability of effecting the movement and transfer of articles in spaces or areas which are of a relatively confined nature, due both to the foldable nature of the chains and aprons and the fact that the transfer operation is effected in a vertical plane. While ordinarily this can be accomplished also by a conventional reciprocable type lift mechanism or elevator, the vertical conveyor has a somewhat simpler, less cumbersome construction than the typical lift or elevator units. In addition, the vertical conveyor because it has no reciprocal motion and is continuous of operation, generally has a smoother, faster all around operation than the conventional lift or elevator type mechanism.

Also, with the continuous vertical conveyor mechanism, the aprons are at all times maintained in a level or horizontal position during movement with the chains between the infeed and discharge elevations. Thus, this type of conveyor, in contradistinction to an inclined powered belt-type conveyor, for example, is capable of handling articles which for one reason or another must be maintained upright or level during their transfer movement. Then too, due to the foldable or flexible nature of the continuous vertical conveyor construction, the initial loading of the articles in the mechanism and the subsequent removal of the articles therefrom may be accomplished with a minimum of external mechanisms, in some cases requiring only stationary roller-type platforms at the infeed and discharge elevations to initially hold the articles for pick-up by the aprons and to receive the same as the latter move past the delivery or discharge elevation.

Despite the above mentioned features and advantages, the continuous, vertical conveyor mechanism has enjoyed limited commercial success up to the present time at least. It is reasoned that this lack of success is in large measure attributable to the fact that the mechanism, as presently designed, is operable to receive and discharge articles at elevations which are pre-established or fixed in any given construction and thus is limited for use only in applications requiring an elevating or lowering function between a given infeed and discharge elevation. Where space and the nature of the articles permit, this function can normally be performed by more conventional, less expensive conveyor devices.

Accordingly, therefore, it may be stated that a principal object of the present invention is the provision of a continuous vertical conveyor mechanism which is capable of transferring articles from one elevation to a selected series or range of other elevations, or which may, alternatively, selectively transfer articles from a series or range of first elevations to a second elevation.

A further object of the invention is the provision of a continuous vertical conveyor mechanism which is capable of transferring articles between a range or series of elevational positions without interruption in operation to effect the loading and unloading of the articles and changes in the elevational position of article loading or unloading.

A further object of the invention is the provision of a continuous vertical conveyor mechanism wherein this capability of transferring articles between a range of elevational positions is achieved in a manner permitting the commencement of a transfer operation while another, either between the same or different elevations, is still in process.

A further object of the present invention is the provision of a continuous vertical conveyor mechanism wherein the aforesaid capability of transferring articles between varying elevational positions is achieved through a relatively compact, simplified arrangement of parts and assemblies cooperating to provide a high degree of operational efficiency and reliability.

A still further object of the invention is the provision of a continuous vertical conveyor mechanism having in combination with an endless, flexible conveyor operating to transfer articles in a vertical direction, a floating carriage mechanism for controlling the level at which the articles are received by or discharged from the conveyor and which includes, in different forms of the invention, means for automatically loading the articles onto the conveyor or for removing articles therefrom at the desired levels.

Another object of the present invention is the provision of a continuous vertical conveyor mechanism which is adapted to transfer articles from one elevation to another concomitantly while arranging the articles thus being transferred in layers or in tiered relationship at such other elevation and, which is capable of operation in a reverse direction, to automatically effect with articles having a stacked or palletized arrangement, a layer-by-layer transfer of the articles from the stack or pallet.

Other objects and advantages of the present invention will appear in the course of the detailed description of the invention appearing hereinafter.

The accompanying drawings illustrate the best mode presently contemplated of carrying out the invention.

In the drawings.

Referring now to the drawings and more particularly to the embodiment of FIGS. 1 to 13, the novel continuous vertical conveyor means of the present invention is shown in the form of a palletizer 2 operating to transfer groups of articles A at a time from an elevated, infeed station or platform 4 into stacked or layered relationship on a pallet 6 or other supporting member located in the base of the palletizer. While susceptible of handling a wide variety of objects or articles, the palletizer by reason of its unique design may be used to best advantage in conjunction with high volumetric operations such as is present in the canning or bottling lines of soft drink plants and breweries, for example, wherein cases of filled and sealed bottles or cans are produced in the line at rates of up to 40 or more per minute. For present purposes, therefore, the articles are shown in the form of generally rectangular cases or boxes such as may contain bottles or cans of beer or soft drink and the palletizer itself may be considered as operating in conjunction with a conventional bottling or canning line.

The infeed station or platform for the cases is located somewhat above the level to which the cases are to be stacked on the pallet, an arrangement which necessitates elevation of the cases as they pass from the end of the processing line. This may be accomplished through means of a conventional inclined belt conveyor, not shown. Also, the cases in passing to the infeed platform are required to be grouped and arranged in the particular pattern or patterns desired in the pallet. Any conventional pattern forming mechanism may be used for this purpose, it being understood that such mechanism operates in front of the platform and, while structurally independent of the palletizer, is phased to palletizer operation to satisfy the case requirements of the palletizer. A suitable pusher bar or other transfer mechanism, indicated generally at 8, is associated with the infeed platform to transfer each successive group of prepatterned cases A from the platform to the palletizer unit in properly timed relation with the palletizing cycle.

The pallet or other supporting member which is to receive the articles is located in the base of the palletizer and, after its initial placement into the unit, remains stationary until a full complement of layers has been received thereon. At such time, the pallet is removed from the unit for replacement by an empty pallet. Pallet insertion and removal may be accomplished by a fork truck or by automatic mechanism integral with the palletizer.

Referring now to the general organization of the palletizer, a continuous, vertical conveyor 10 operates within a closed path of travel in a structural steel supporting framework 12 to receive successive groups of cases A from receiving platform 4 and lower the same to a generally rectangular, floating carriage mechanism 14 which is vertically movably supported in the framework in coplanar relation above the aforesaid pallet. The carriage mechanism, as will be more fully described hereinafter, is designed to impart a horizontal or traversing movement to the conveyor at selected elevational positions with respect to the pallet and which correspond to the successive levels of the case layers designed thereon simultaneously while effecting through a brush-off or wiping action an in situs transfer of the cases to the pallet or pallet stack as the conveyor traverses the pallet.

The carriage is elevated in the framework in increments corresponding to the height of a single layer of cases as each successive group of articles passes through the carriage mechanism and is transferred thereby to the pallet such that as the next succeeding group of cases moves through the carriage it will be deposited directly onto the uppermost layer of cases on the pallet. In this manner then, the cases are caused to be built-up in layer by layer fashion on the pallet. The novel design of and co-action between the conveyor and floating carriage permit the loading and unloading operations of the articles and the elevation of the carriage in the framework between successive layers of cases to be accomplished without interruption in conveyor movement.

Figure 1:
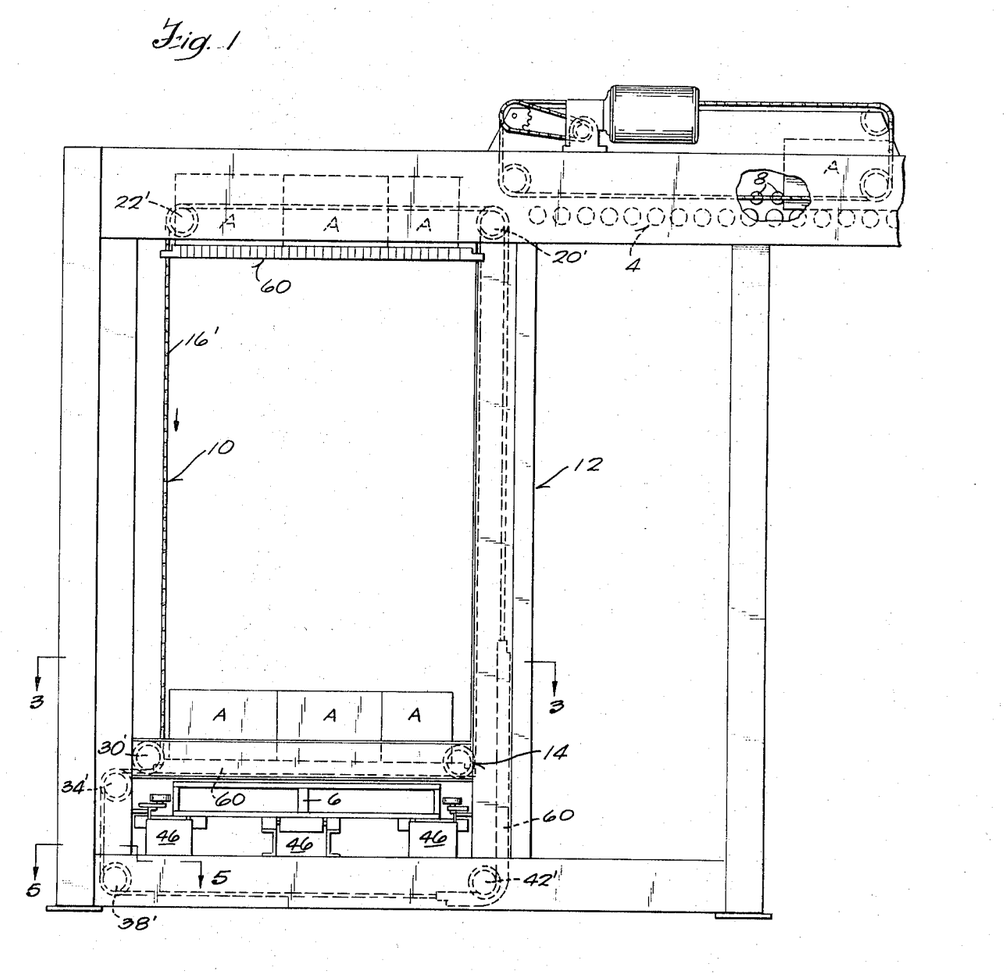
FIG. 1 is a side elevational view of a palletizer embodying the present invention with portions thereof shown in phantom to enable a more complete understanding of interior construction.
Figure 2:
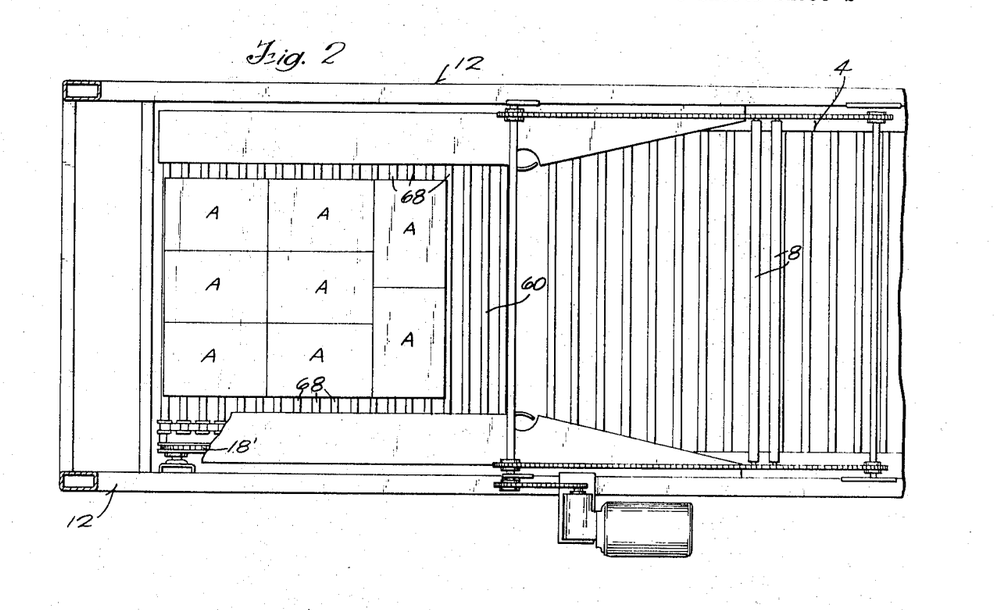
FIG. 2 is a plan view of the palletizer shown in FIG. 1 with portions of the palletizer broken away for clarity of illustration.
Figure 3:
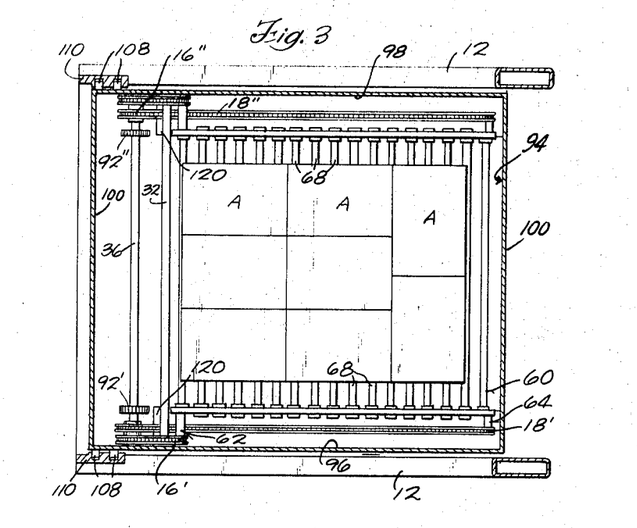
FIG. 3 is a horizontal sectional view of the palletizer on the lines 3—3 of FIG. 1.
Figure 4:
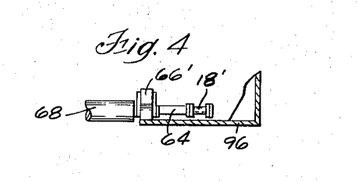
FIG. 4 is an enlarged, fragmentary section on the lines 4—4 of FIG. 3 of the interengaging portions of the floating carriage assembly and support aprons.
Figure 5:
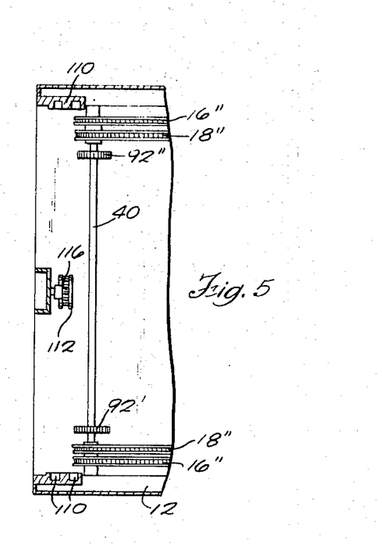
FIG. 5 is a horizontal, fragmentary section of the lower, left corner portion of the palletizer and taken on the view lines 5—5 of FIG. 1.

Proceeding now to the specific details of the palletizer, the conveyor 10 comprises primary and secondary sets or pairs of endless, flexible lineal members in the form of chains 16'–16" and 18'–18" respectively, located with one chain of each pair, and in this case the chain identified by single primed reference numeral, in a vertical plane along the front of the framework and with the other chain of the set, and in this case the chain identified by the double primed reference numeral, located directly opposite its companion chain in a vertical plane through the rear portion of the framework. The primary chains 16'–16" are supported for travel in the direction indicated by the arrows in the drawings by a series of sprockets, including a set of drive sprockets 20'–20" located in the upper, right corner of the framework and a set of idler sprockets 22'–22" disposed in the upper, left corner of the framework in the same horizontal plane as the sprockets 20'–20". Sprockets 20'–22" are carried on a transverse driveshaft 24 to which is applied power by any conventional means such as the motor and gear train mechanism 26 to drive the chains 16'–16" in the indicated direction in the framework. The idler sprockets 22'–22" are supported in the framework in the indicated position by respective of the stub shafts 28'–28". The chains 16'–16" extend horizontally between the sprocket sets 20'–20" and 22'–22" and pass vertically downwardly, referring to the direction of travel of the chains in the framework, from the latter sprockets to a first set of idler sprockets 30'–30" supported in the floating carriage assembly by a transverse shaft 32 which is rotatably mounted in the carriage by suitable bearings. The chains pass under the sprockets and horizontally outwardly to and downwardly over a second set of idler sprockets 34'–34" carried in the extreme left end of the carriage in a horizontal plane somewhat below the plane containing sprockets 30'–30" on a transverse mounting shaft 36, also rotatably mounted in the carriage on suitable end bearings. From the sprockets 34'–34", the chains 16'–16" pass vertically downwardly to and inwardly under a set of idler sprockets 38'–38" carried in the lower left corner of the framework on a transverse mounting shaft 40. The chains 16'–16" extend horizontally to and upwardly around a further set of idler sprockets 42'–42" arranged in the lower right hand corner of the framework on another transverse mounting shaft 44 to complete the aforesaid drive sprockets 20'–22" a closed path of travel in the framework for the chains 16'–16". In this connection, it will be noted that the chains 16'–16" traverse the bottom of the framework in a plane below that of the pallet which is supported just off the lower end of the framework on support brackets 46 carried in the framework in raised relation to the bottom extremity thereof, as shown in FIG. 1 for example.

The chains 18'–18" are arranged in the framework within the runs of vertical planes of chains 16'–16" by a further series of mounting sprockets, including a set of drive sprockets 48'–48" located in the upper, right corner of the framework on the aforesaid driveshaft 24 for the drive sprockets 20'–20" of chains 16'–16". The radius and tooth construction of the drive sprockets 48'–48" and 20'–20" are identical causing the chains 18'–18" to be driven in the framework from the motor-gear mechanism 26 in synchronous relation to the chains 16'–16". The chains 18'–18" pass vertically downwardly from the drive sprockets 48'–48" in parallelism with the chains 16'–16" to a set of idler sprockets 50'–50" carried in the floating carriage assembly on respective of the stub shafts 52'–52". The chains pass under and horizontally outwardly from the idlers 50'–50" in a right to left direction as viewed in the drawings to a second set of idler sprockets 54'–54" carried on the aforementioned mounting shaft 36 for the sprockets 34'–34" in the left extremity of the carriage. From the sprockets 54'–54", the chains 18'–18" follow the travel paths of the chains 16'–16", passing downwardly to and inwardly around a set of idler sprockets 56'–56" carried in the left, lower corner of the framework on the previously mentioned mounting shaft 40 for sprockets 38'–38" then horizontally across the bottom of the framework to another set of idler sprockets 58'–58" supported in the right, lower corner of the framework by transverse shaft 44, and finally upwardly around such sprockets to the aforesaid drive sprockets 48'–48" on shaft 24.

The chain pairs 16'–16" and 18'–18" have supported therebetween at corresponding elevational positions a number of one-way flexible support aprons 60 of generally rectangular construction and conforming generally in width to the lateral spacing of the inside chains 18'–18" and in length to the side-to-side spacing of the chains 16'–16" and 18'–18" in the vertical pass from the upper end of the framework to the carriage mechanism. Three such aprons are employed in the illustrated conveyor assembly with the aprons located equi-distantly of one another in either direction along the length of the chains. It is to be understood, however, that the number of platforms may vary anywhere upwardly from one depending upon the height of the articles being palletized, the vertical spacing between the infeed platform for the articles and the top of the finished pallet, etc. Also, in the case of a plurality of platforms, there is no necessity for locating the platforms in equi-spaced relation to one another along the chains.

The platforms which are identically constructed comprise leading and trailing bars 62 and 64 respectively, a pair of flexible side support members 66'–66" pivotally connected to the opposite ends of the bars 62 and 64 and a plurality of elongated rollers 68 defining a support surface for the articles or cases extending and connected between the side support members 66'–66". The leading bar 62 spans and is carried by the primary chains 16'–16", being attached across its ends to corresponding of the individual linkages of the chains 16'–16" by pin means 70 to permit the bar to turn freely with the chains around the previously described support sprockets therefor. The leading bar 62 is required to cross the secondary or inner set of chains 18'–18" in those portions of the travel path of the chains which are coincident with one another and to permit this interdiction and eliminate interference between the bar and chains 18'–18", the opposite end portions of bar 62 are provided with notches or cut-outs 72 shaped and oriented to receive the inner chains 18′–18″ as and to the extent required in the circumlocution of the aprons in the framework. The rear or trailing bar 64 spans the secondary set of chains 18′–18″ and is connected thereto in the manner described for leading bar 62.

The side support members comprise a series of individual roller linkages 74 pivotally connected together in end-to-end relation by transverse pins 76. The terminal linkages 74′ of each of the side support members are fastened within corresponding of the recessed portions 78 and 80 provided in the ends of the front and rear bars 62 and 64 respectively as by pivot means 82 anchored in the bars in bridging relation to the recesses.

Associated with the linkages are a series of blocks or bars 84 arranged and constructed to lock and impart rigidity to the side support members and to the aprons proper in portions of the travel path of the aprons in the framework while permitting at the same time a free flexing or folding action of the side members and the aprons proper in other portions of the travel path of the aprons in the framework. The blocks shown herein as having a rectangular cross-sectional area are located one to a linkage between pairs of attachment lugs or ears 86 formed along a common edge or surface thereof with fastener pins 88 being inserted through the lugs and the corresponding blocks to hold the latter in place. The blocks are coextensive in length with the linkages and are preferably positioned thereon with their ends disposed at the junctures formed between each pair of adjacent linkages 74.

With the blocks thus positioned, the individual linkages of the side support members are free on the one hand to pivot with respect to one another in one direction about their pivot axes with adjacent linkages whereby to permit an unrestricted folding or bending action of the side support members in a first direction normally of a plane through the pivot axes of the linkages. At the same time, however, the blocks effect through a wedging engagement across their ends a positive locking action against pivoting movement of the linkages in an opposite direction about their pivot axes to preclude flexing or folding of the side support members in a 180° opposite direction to a plane through the pivot axes of the several linkages. As will be more fully described hereinafter, it is through this one-way flex action which is afforded the side support members by the bars or blocks that the aprons achieve the capability of undergoing a folding or flexing motion with the chains in portions of the travel path of the aprons in the framework and of attaining a rigid, load carrying condition between the chains in other positions of travel in the framework.

This one-way locking-folding action of the side support members and of the aprons may be attained through a number of different configurations of the blocks or of the links themselves but for purposes of simplicity and overall strength, the described arrangement is to be preferred.

Figures 6, 7, 8, 9:
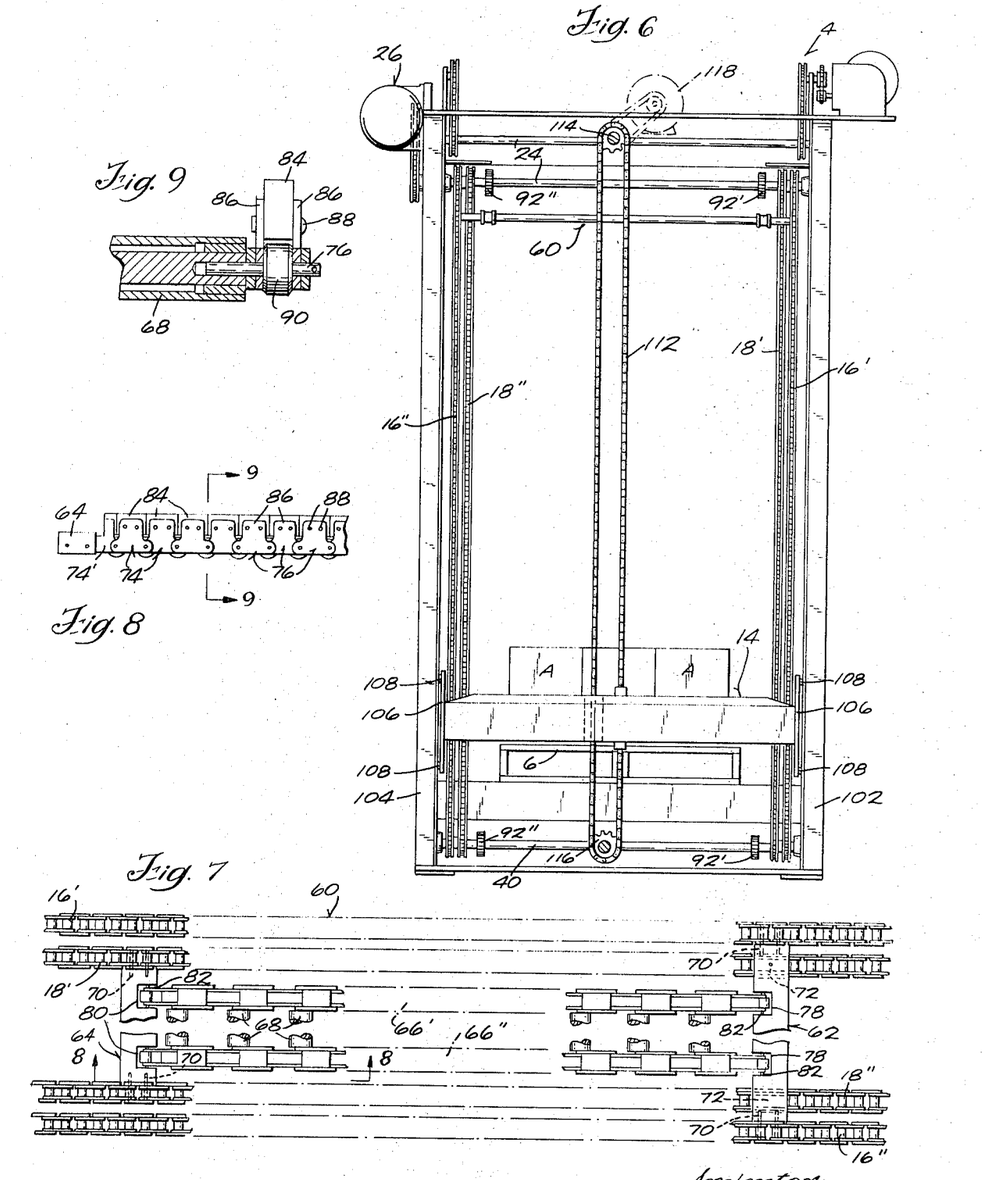
FIG. 6 is an end elevation of the palletizer of FIG. 1 with parts being removed for clarity of illustration.
FIG. 7 is an elevational view, on an enlarged scale, of one of the support aprons of the palletizer along with the supporting chain structure of the apron, with the apron being viewed on what may be considered as its upper or top surface.
FIG. 8 is a side elevational view of a fragmentary portion of the support apron of FIG. 7.
FIG. 9 is a fragmentary sectional view of the support apron taken on the lines 9—9 of FIG. 8.
Figure 10:
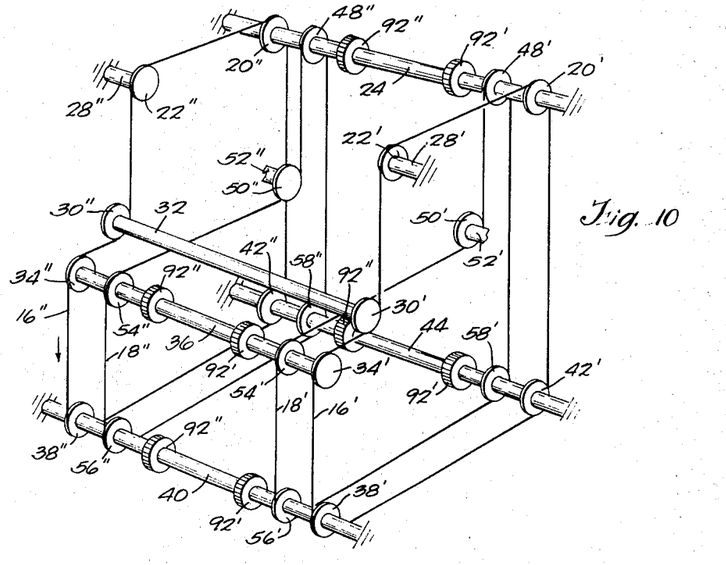
FIG. 10 is a schematic view, in perspective, of the palletizer of the invention, illustrating the general arrangement therein of the conveyor chains and the chain supporting structure.

The plurality of elongated rollers 68 for supporting the cases or other articles being handled in the palletizer during transfer to the pallet are carried by the side support members in parallelism with the front and leading bars. In the illustrated construction, the rollers are arranged at the alternate joints of the linkages 74. The rollers are preferably rotatably connected to the linkages as by the aforesaid pivot pins 76 connecting the linkages, as aforesaid whereby to align the elongated rollers with the rollers 90 of the individual linkage, as shown in FIG. 9.

In order to provide additional support and guidance for the aprons as they are moved through the framework by the chains, a plurality of sets of tracking rollers 92′–92″ adapted to be engaged by the opposed side support members of the aprons are arranged at various points throughout the framework on coincident axes with certain of the aforesaid sprockets for the primary and secondary chains 16′–16″ and 18′–18″. A first set of such rollers 92′–92″ is arranged on the upper, right corner mounting shaft 24 for the aforesaid sprocket sets 20′–20″ and 48′–48″. Another set of the rollers is provided in the carriage mechanism 14 on the aforedescribed mounting shaft 36 for sprockets 34′–34″ and 54′–54″. Finally, additional sets of the track rollers are mounted in the lower end of the framework in each corner thereof, being mounted in the left-hand corner on mounting shaft 40 for sprocket sets 38′–38″ and 56′–56″ and in the right-hand corner on shaft 44 for sprocket set 42′–42″ and 58′–58″. In each instance, the rollers 92′–92″ are arranged inside of the corresponding sprockets for the chains 18′–18″.

Turning now to the constructional details of the floating carriage mechanism the reference numeral 94 indicates a generally rectangular, open box-like frame constituting the body of the carriage and formed of fore and aft L-section beams 96 and 98 respectively and opposed end beams 100 connected to the opposed ends of the beams 96 and 98. The left-hand end beam 100 is straddled by upright framing posts 102 and 104 of the aforesaid supporting framework 12 and has attached to its opposed ends guide plates 106 formed with tracking pins 108. The framing posts 102 and 104 have parallel ways or grooves 110 on their facing or inside surfaces for receiving the pins 108 of the plates 106 to guide the carriage for vertical travel in the framework.

The actual support of the carriage in the framework is provided by a powered chain 112 carried between an overhead drive sprocket 114 and a lower, idler sprocket 116 fixedly mounted in the left end of the framework. The opposed ends of the chain 112 are fixedly connected to the carriage mechanism in any suitable manner such that as the drive sprocket 114 is rotated in either direction, the carriage will be raised or lowered in the framework by the chain 112. A reversible-type motor 118 mounted in the framework adjacent sprocket 114 powers the chain to elevate or lower the carriage in the framework, as desired.

The aforesaid sprocket sets 30′–30″ and 34′–34″ for the chain sets 16′–16″ and the sprocket sets 50′–50″ and 54′–54″ for the chain sets 18′–18″ are carried on their respective shafts along the inside walls of the fore and aft beams 96 and 98 of the carriage in the positions previously indicated. The lower flange of the beams 96 and 98 extends under the sprockets of the sets 50′–50″ and 30′–30″ as shown particularly in FIGS. 3 and 4 of the drawings and is interrupted along the left extremity as at 120 to accommodate the sprockets 34′–34″ and 54′–54″ which as previously noted are mounted in the carriage in a horizontal plane below that of the sprockets 30′–30″ and 50′–50″. The beam flanges, in addition to lending structural reinforcement to the carriage proper, define a tracking or supporting surface for the linkage rollers 90 of the apron side support members 66′–66″ so as to maintain the support members and the apron itself in an absolutely rigid, true horizontal position as the aprons pass through the carriage. This precludes the possibility of interference between the aprons and the pallet or top layer of palletized cases as the aprons traverse the pallet. At the same, the interaction between the beam flanges and the linkage rollers 90 insures that each successive charge of cases passing through the carriage will be indexed in a fixed or given position with respect to the carriage to insure the proper transference of the cases from the apron to the pallet or pallet stack. This transference is adapted to be effected by means of the aforesaid transverse mounting shaft 32 which supports the sprockets 30′–30″ in the carriage as previously described. The shaft as can be observed in the drawings is elevated somewhat from the bottom of the carriage such that while the apron may travel freely thereunder the cases in moving through the carriage on an apron will engage the shaft 32 and thereby be prevented from moving past the shaft with the apron. As a result, as any particular apron moves through the carriage with a complement of cases, the apron will move out from under the cases to thereby strip or wipe the cases from the apron with the cases dropping, in row-by-row fashion, and sequentially from the rear to the front of the apron, directly onto the pallet or the previous layer of palletized cases. The necessary motion of the apron relative to the cases which occurs in this transfer action is accomplished without undue force or drag on the cases due to the rotatable mounting of the supporting rollers 68 in the apron side support members 66′–66″.

Figure 11:
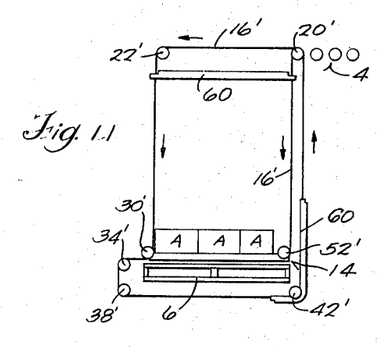
FIGS. 11 to 13 are schematic views showing successive stages of operation of the palletizer in arranging articles in layers on a pallet.

In operation of the palletizer and assuming an empty pallet is in place in the base of the framework, the floating carriage mechanism 14 is initially lowered in the framework through its motor 118 to a position in which the carriage body 94 is just off the top face of the pallet, such as is shown in FIG. 11. The conveyor assembly 10 is then started in operation through its associated drive or power means 26 to cause a continuous cycling of the aprons in the framework through the support chains 16′–16″ and 18′–18″ and the cooperating sets of idler and drive sprockets previously mentioned. The pattern forming and case feed mechanisms are also started in operation to provide groups of patterned cases to the infeed station 4 on a continuing basis and to effect the automatic transfer of the cases to the palletizer.

The aprons 60 are arranged in the conveyor such that the aforesaid locking bars or blocks 84 of the side support members 66′–66″ assume an outer or upper most position relative to their respective carrier linkages as the aprons with which they are associated move around the upper right corner sprockets and proceed horizontally across the top of the framework. Thus, as an apron proceeds across the top of the framework, the locking bars or blocks of the side support members associated with such apron move progressively into end-to-end abutting relation with adjacent blocks in the manner previously indicated to lock the side support members and the apron itself in a position of rigidity as to loads applied downwardly thereto. The case transfer mechanism indicated in part at 8 is timed for operation with the conveyor assembly such that as an apron commences travel across the top of the framework and prior to the trailing bar thereof passing around the inner set of sprockets 48′–48″ a charge of cases is transferred from the infeed station onto the apron. This transfer operation which may be commenced at various relative stages of movement of an apron around the sprockets 20′–20″ is in any eventuality completed substantially at the same time the apron to which the cases are being transferred approaches a fully extended position along the top of the framework so that there need be no interruption in travel of the aprons for loading purposes.

Figure 12:
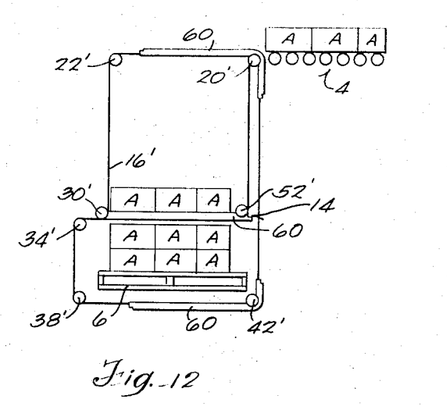
Figure 13:
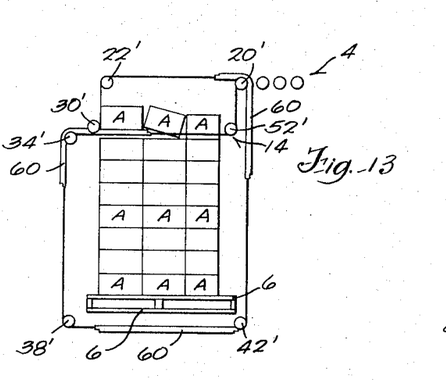

A typical such transfer operation is illustrated schematically in FIG. 12 of the drawings. With reference thereto, it will be noted that the cases in the illustrated arrangement will be required to be swept onto the aprons at a linear rate of travel which exceeds the linear travel rate of the aprons in the framework so as to position the cases in a centered position on the apron. To prevent the cases from overriding the apron during this loading operation, the loading bar 62 of the apron may, if desired, be shaped to provide a raised shoulder or lip on the surface thereof which faces upwardly when the apron traverses the top of the framework so that the cases will be restrained for forward movement on the aprons upon contact with the bar 62.

As the apron reaches a condition of full extension at the top of the framework, the outer chains 16′–16″ at the point of their attachment to the leading bar 62 of the apron pass around and downwardly from the sprockets 22′–22″ and at this same time the inner chains 18′–18″ at their corresponding points of attachment to the trailing bar 64 move similarly around and downwardly from the sprockets 48′–48″ to thereby initiate downward travel of the apron and the cases supported thereon in the framework with the apron in a horizontal, level position between the chains. The chain pairs 16′–16″ and 18′–18″ at their respective attachment points to the apron continue to travel downwardly in synchronous relation with one another until the apron is at the level of the floating carriage mechanism 14. At this point, sprocket sets 30′–30″ cause the primary chains 16′–16″ to move horizontally in a right to left direction in the carriage while the sprocket sets 50′–50″ cause a similar movement to the secondary chains 18′–18″, causing the apron in turn to move horizontally through the carriage. The apron bars 62 and 64 turn with their respective chains 16′–16″ and 18′–18″ as the latter pass around the sprockets but due to the journalled connection between the side support members 66′–66″ and the bars the side support members and the aprons proper remain in a horizontal position so as to retain the cases in a level position on the apron as the latter moves into and then through the carriage. Also, as previously indicated, the linkage rollers 90 of the side support members 66′–66″ engage and ride on the flanges of the respective beams 96 and 98 as the apron moves through the carriage to insure positive indexing and leveling of the apron in the carriage. As the apron proceeds through the carriage, the cases engage the aforesaid sprocket mounting shaft 32 and are thereby brushed or stripped directly from the supporting rollers 68 of the apron and onto the pallet progressively from the rear to the front of the apron. As the leading edge of the apron reaches sprockets 34′–34″ in the left extremity of the carriage, the primary chains at their respective points of attachment to the apron move radially around and downwardly therefrom towards the sprockets 38′–38″ in the lower, left corner portion of the framework. In the course of this movement of the chains, the locking bars of the apron side support members 66′–66″ pivot or flake outwardly with respect to one another to permit the apron to flex or fold with the chains around the sprockets 34′–34″ and 58′–58″. The blocks undergo a similar flaking as the apron with which they are associated is caused by the chain pairs 16′–16″ and 18′–18″ to progress inwardly around the left, lower corner sprockets 38′–38″ and 56′–56″ and then the right, lower corner sprockets 42′–42″ and 58′–58″ whereby to return the apron to the receiving station for another charge of articles without interruption in conveyor travel. The aprons in moving across the top of the framework, through the carriage and then inwardly across the bottom of the framework and back upwardly to the infeed station trackingly engage the various rollers 92′–92″ through the roller linkages of its side support members 66′–66″ and are thereby maintained accurately between the chain pairs 16′–16″ and 18′–18″ to insure the proper performance of the loading and unloading operations.

As soon as an apron has completed its travel through the carriage and the trailing bar thereof has turned the corner at sprockets 54′–54″ the carriage is raised in the framework a distance corresponding to the height of the cases being palletized such that as the next apron proceeds into and through the carriage with a charge of articles, the latter will be deposited directly onto the top of the cases previously transferred to the pallet. In this connection, it will be noted that the carriage by reason of its novel mounting in the framework may be raised as the chains move downwardly thereto with another fully loaded apron and thus, there is little loss of time between the unloading of one apron and the movement into the carriage of another, fully loaded apron. This process of unloading an apron, moving the carriage upwardly from the pallet to receive an ensuing apron continues until the desired number of layers is provided on the pallet. At this point the carriage is raised slightly in the framework to clear the uppermost layer and the loaded pallet is then removed from the palletizer as by a fork lift truck, for example, or by suitable means.

The particular means for controlling the raising and lowering of the floating carriage mechanism in the framework while not shown herein is interlocked through conduit means which may include conventional control elements such as phototubes, proximity switches or limit switches, for example, relays, contacts, etc., to the conveyor assembly such that following the deposit of a layer of cases on the pallet and the passage of an apron from the carriage the motor 118 is automatically activated to raise the carriage the desired increment in the framework. Also, photo tubes or other means may be provided in the control circuit to move the carriage from its uppermost position in the framework to a starting position directly above the pallet when a palletizing cycle has been completed and a loaded pallet removed from the framework. Similar means may be utilized to position the carriage in its correct starting position relatively of the pallet. The control circuit preferably also includes means for timing the case transfer mechanism at the infeed station to the movement of the aprons in the framework to insure proper loading of the cases onto the aprons as the latter traverse the upper end of the framework. The development of a control circuit to attain the aforesaid operations of the various operating assemblies of the palletizer is considered to be within the skills of a mechanic having ordinary skill in the art to which the invention ulates and accordingly a showing thereof is omitted in the present instance.

The palletizer described herein is capable of an extremely smooth, fast operation, inasmuch as the novel coaction and arrangement between the conveyor and the carriage mechanism permits a multiple arrangement of transfer aprons each of which moves continuously in the palletizer to provide for the simultaneous conduction in one stage or another of a series of transfer operations between the infeed station for the articles and the pallet. Thus, for example, with a palletizer having three aprons, there may be at any particular instant of time one apron in the process of depositing a charge of articles on the pallet, a second apron in the process of receiving a charge of articles from the infeed station, and a third apron in the process of moving from the pallet to the infeed station to receive another complement of articles. Obviously, this arrangement leads to a highly efficient, rapid palletizing operation.

It will be observed that the carriage mechanism operates to move the aprons through an unloading or transfer pass in close elevational proximity with the pallet or with the uppermost layer of articles thereon, as the case may be. As a consequence, thereof, the articles in the course of being stripped from the aprons and deposited on the pallet or pallet stack have a vertical drop of negligible proportions. The articles will thus tend to remain in fairly packed relationship as they move into the pallet from the apron whereby to provide a stable pallet without operator attention to this facet of the palletizing cycle. Then too, the small magnitude of article drop to the pallet minimizes the shock to which the articles are subjected in moving onto the pallet. It is thus possible to effect the palletizing of articles of a frangible nature with the mechanism of the present invention.

The palletizer, by lowering the articles to the pallet rather than raising the pallet to the articles and then dropping the pallet in increments as each layer is built up thereon as practiced in many conventional palletizers, obviates the necessity of supporting and moving the entire mass of the pallet and the articles being deposited thereon during the performance of a palletizing cycle. As a result, the palletizer of the invention may be fabricated of lighter weight, less expensive parts and components than heretofore possible. Also, for this same reason, the herein described palletizer tends to be more trouble-free in operation and repairs and maintenance may be performed quite readily thereon.

Referring now to the embodiment of the invention which is shown in FIGS. 14 to 18, a mechanism which is alike in all essential respects to the palletizer just described operates to remove articles, such as cases A, arranged in layers or in stacked relation on a pallet or other support surface from the pallet on other support surface in layer-by-layer fashion by substantially the reverse process to that described hereinbefore. More particularly, in this embodiment of the invention, a conveyor 122 having flexible pairs of endless chains, including a primary set 124'–124" and a secondary set 126'–126" operates in a closed path of travel in a framework 128 to cycle one-way flexible support aprons 130 in a reverse direction to that described for the palletizer 2 and successively through a floating carriage mechanism 132 positioned at the top layer of palletized cases A to a horizontal discharge platform 134 disposed adjacent and on a level with the upper end of the framework, downwardly along one side of the framework, inwardly across the bottom of the framework under the pallet and then upwardly along the opposite side of the framework to the top or uppermost layer of cases on the pallet. The chain pairs 124'–124" and 126'–126" are supported for travel in the framework by sets of sprockets 136'–136" and 138'–138" respectively, shown in part only, arranged in an identical manner to that specified for the palletizer whereby to cause the pairs of chains to travel in vertical, parallel planes with one another in moving upwardly from the carriage mechanism to the upper end of the framework and to travel in coincident planes in returning from the top of the framework to the carriage. The aprons which have the same essential construction as described for the aprons 60 of the palletizer are, as before, adapted to assume a horizontal, rigid position between the chains in moving therewith in the vertical, parallel portions of travel and to assume through a folding action, a position between and in the same plane as the chains when moving therewith in the coincident portion of travel.

Figure 14:
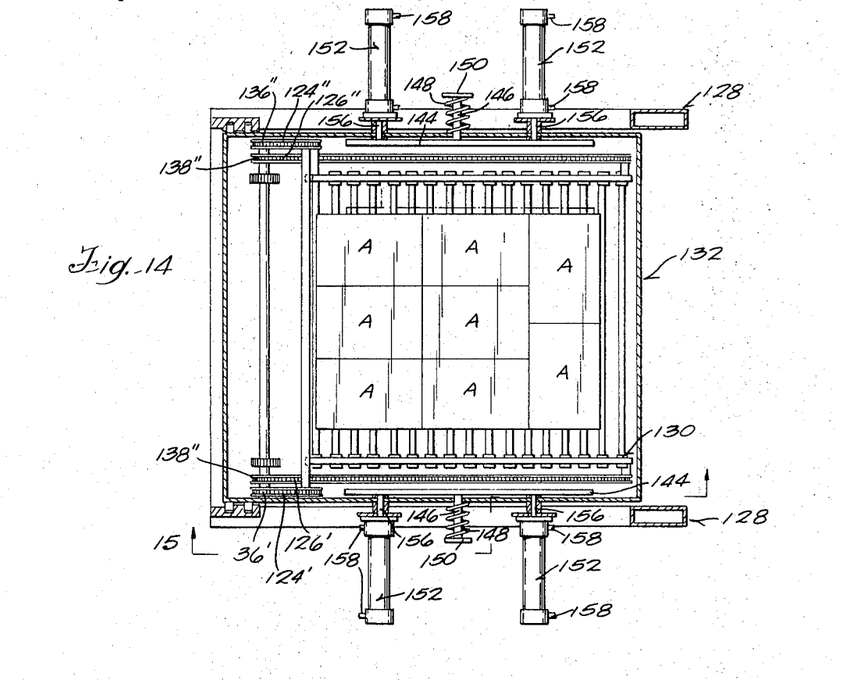
FIG. 14 is a plan view of a floating carriage assembly as modified to permit the pick-up and transfer to the support aprons of articles arranged in palletized relation for purposes of effecting the layer-by-layer removal of articles from a pallet.
Figure 15:
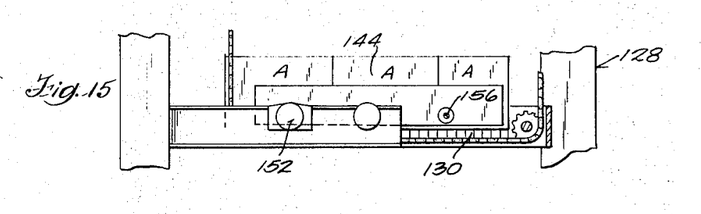
FIG. 15 is a vertical section of the modified form of the carriage mechanism taken on the lines 15—15 of FIG. 14.

The carriage mechanism 132 is constructed similarly to the carriage 14 except that in the present instance the fore and aft carriage beams, 140 and 142 respectively, each have a clamping plate 144 mounted on the inside wall thereof for grippingly engaging the cases in the top layer of the pallet to permit raising of the layer by the carriage prior to an apron moving into a loading position in the carriage. The plates 144, as shown in FIG. 14, are arranged directly opposite one another and, for proper clamping and raising action of all the cases in a layer, extend substantially the full distance by which the upper of the sprocket sets 136'–136" in the carriage is spaced from the upper or right-hand of the carriage sprocket sets 138'–138". The clamping plate mounting structure includes a pair of connector rods 146 slidably supported in each of the carriage beam members 140 and 142 and connected at one end directly to opposite ends of the corresponding clamping plates. The other or outer end of each of the rods has a compression spring 148 mounted concentrically thereon and which acts between a nut-washer arrangement 150 on the rods and a corresponding of the beams 140 and 142 to bias the clamping plates relatively towards their associated beams and from clamping engagement with the cases on the pallet.

The plates 144 are adapted to be moved into a clamping position with the cases or other articles being handled in the mechanism by pairs of double-acting hydraulic or pneumatic piston-cylinder assemblies 152 carried on each of the fore and aft beams of the carriage mechanism adjacent the opposed ends of each of the plates. One operating element of each of the assemblies 152, and in this case the cylinder 154, is attached to its respective beam 140 or 142 on the outer wall thereof. The cooperating elements of the assemblies and in this case the piston-piston rod unit 156 extends through a suitable aperture in its respective beam 140 or 142 and is attached directly to a corresponding of the clamp plate 144 by any suitable means. Fluid lines 158 connected with the opposite ends of the cylinders 154 of each of the assemblies 146 provide for fluid pressure application on one side of the piston-piston rod units 156, simultaneously with pressure release on the other side thereof whereby to extend and retract the units as desired and thereby move the clamping plates selectively into and out of clamping positions.

In the opeartion of this embodiment of the invention, the floating carriage assembly 132 is initially raised fully upwardly in the framework and a fully loaded pallet is then positioned in the base of the framework, there being suitable support brackets or rails in the framework to retain the pallet up from the lower end thereof. Insertion of the loaded pallet may be effected by a fork lift truck or by suitable automatic means, as desired.

Figure 16:
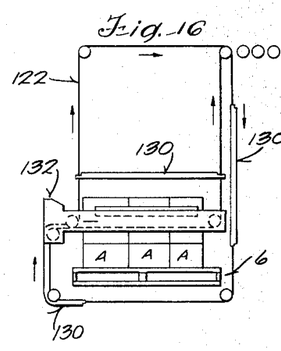
FIGS. 16 to 18 are schematic views of a mechanism embodying the carriage assembly of FIG. 14 showing successive stages of operation of the mechanism in effecting the pick-up and transfer of a layer of articles from a pallet.
Figure 17:
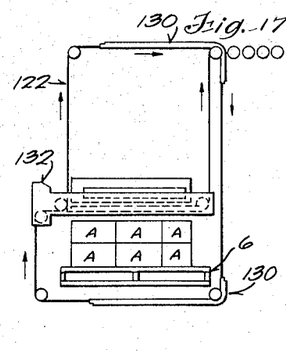
Figure 18:
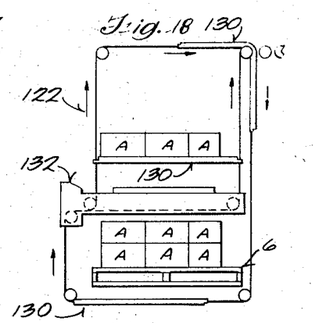

The carriage mechanism is then lowered downwardly over the top layer of cases on the pallet and to a position in which the clamping plates are directly opposite the cases on uppermost layer, as shown schematically in FIG. 16. At this point, the plates are extended inwardly from their associated beams 140 and 142 and into clamping engagement with the cases by application of fluid pressure to the appropriate end of the cylinders of the units 152. With the plates 144 in full clamping engagement with the outermost cases, the carriage is then raised in the framework sufficiently to move the top layer of cases just off the underlying case layer, such as shown in FIG. 17, and the carriage is then maintained stationary in preparation of the passage of an apron 130 into loading position in the carriage. During this sepaartion of the case layers, the conveyor 10 is in an operating condition with the case separation function being timed to the movement of the aprons in the framework such that an apron will commence to move into and through the carriage only after the latter has effected separation of the top layer of the pallet and is in a steady position above the pallet stack. As in the previous form of the invention, the aprons 130 are oriented in the framework to provide through means of the one-way pivotable linkages which form the sides thereof a locking action across the aprons during transitional movement of the aprons from the vertical to the horizontal and during transition of the chains 124'-124" and 126-126" from movement in coincident planes to movement in vertical parallel planes at the left end of the carriage mechanism. The aprons upon passing into a horizontal position in the carriage thus lock-up and remain locked or rigid as they are moved by the chains upwardly out of the carriage and relatively toward the cases held between the clamping plates. The piston-cylinder units are retracted to release the clamping plates from the cases prior to the aprons reaching the bottom surface of the cases and in this manner the cases are transferred gently onto the aprons and carried vertically on through the carriage to the top of the framework. The cases pass from the aprons and onto a stationary platform located at the top of the framework by the horizontal motion of the aprons across the top of the latter.

As soon as an apron has cleared the carriage with its cases, the carriage is lowered over the next layer of cases whereupon clamping pressure is applied to the plates and the carriage again raised to provide the necessary degree of layer-to-layer separation for the entry into the carriage of the next ensuing apron. This process is continued until all the cases have been removed a layer at a time from the pallet.

A relatively fast and smooth operating means for effecting the automatic depalletizing of articles is thus provided. In addition, by reason of the novel manner in which the cases are transferred from the pallet stack to the moving aprons, the structural parts of the mechanisms are required to sustain relatively small static and dynamic loads and, as a result, an overall relatively lightweight construction may be provided for the mechanism. Maintenance problems tend to become rather negligible by reason of this novel operation.

From a fabrication standpoint, many parts of the mechanism are the same whether it is to serve as a palletizer or depalletizer and it is possible therefore to attain economies of manufacture not normally possible for two functionally different machines.

While the adaptive forms of the invention previously described herein illustrate some of the more refined uses to which the invention may be put, it is well to point out that the invention may be employed for carrying out the simple transference of articles, either singularly or severally at a time, from one elevation to one of a preselected of a series of second elevation or alternatively, from one of a series of first elevations to a given or pre-established second elevation. Such a use of the continuous vertical conveyor principle is possible by reason of the unique coaction between the floating carriage mechanism and the continuous, vertical conveyor which makes possible on a commercially feasible scale the shifting of the levels to which the articles are being delivered or at which they are being received concurrently while other articles are in the process of transfer movement. Possible contemplated uses for this further form of the invention range from warehousing operations where it is desired to transfer processed articles to pre-selected or pre-arranged levels or shelfs depending upon the patricular size, model or other parameter of the articles or for receiving articles from a series of shelfs, levels, floors, in either a systematic or random order, and transferring the same to a given selected level, shelf, floor or the like for shipment, use or the like. Such a use of the present invention could entail suitable electric or electronic circuitry to permit such functioning to be pre-programmed if the patricular application would warrant it.

Various modes of carrying out the invention are contemplated as being within the scope of the following claims, particularly pointing out and distinctly claiming the subject matter which is regarded as the invention.

I claim:

1. Apparatus for transferring groups of articles at a time from a first elevation to a receiver platform at a second, lower elevation concurrently while arranging successive groups of articles thus transferred in layers on such receiver platform, comprising a continuous, flexible conveyor having pairs of endless, flexible lineal members arranged for travel in closed, vertical loops between said first and second elevations and one-way flexible support aprons for the articles connected between said lineal members and movable in a horizontal, rigid position between said lineal members from said first elevation to given, selected positions above said receiver platform and movable in a folded position between and in the same plane as the lineal members from given, selected positions above said receiver platform to said first elevation, vertically movable carriage means disposed above said receiver platform and having means therein for changing the lineal members from movement in vertical, parallel planes to movement in coincident planes at given, selected positions relatively of the receiver platform and for concurrently therewith imparting a traversing movement to said apron means relatively of the receiver platform at such given, selected positions thereto such given, selected positions corresponding to the elevation of the successive layers of articles to be arranged on the receiver platform and being progressively higher from the platform as successive aprons traverse the carriage means, means for loading articles onto said apron means when in a horizontal, rigid position between the lineal members at said first elevation and means for transferring articles from said apron means to said receiver platform as said apron means is caused to traverse the receiver platform by said carriage means.

2. Apparatus for effecting the transfer of articles arranged in layers at a first elevation to a second, upper elevation in a layer-by-layer fashion, comprising pairs of endless, flexible lineal members arranged for travel in closed, vertical loops extending from said first elevation to said second, upper elevation with portions of said lineal members movable upwardly in vertical, parallel planes with one another from a position above the articles at said first elevation to said second elevation and with other portions of said members movable in coincident planes with one another in returning from said second elevation to a position above the articles at said first elevation, one-way foldable apron means connected between said pairs of lineal members and adapted to be disposed in a horizontal, rigid position normally of said lineal members when the latter are moving in vertical, parallel planes and in a folded position between and in the same plane as the lineal members when the latter are moving in coincident planes, vertically movable carriage means associated with the lineal members and having means therein for changing the lineal members from movement in coincident planes to movement in vertical, parallel planes at given selected positions with respect to the layers of articles at said first elevation and for causing at least one pair of said lineal members to traverse the articles at such given, selected positions prior to moving upwardly in vertical, parallelism with the other pair of said lineal members whereby to cause a corresponding traversing movement of the apron means with respect to the articles, clamping means carried by said carriage means for clampingly engaging the articles in the successive upper layers thereof when said carriage means is in a first position with respect to the successive layers, means for actuating said clamping means into clamping engagement with successive of the upper layers of articles when said carriage means in a said first position thereto and prior to successive of the apron means traversing the articles, said carriage then being raised to a second position relative to successive of the layers to elevate successive layers of articles thus engaged by the clamping means from the underlying layer of articles, means for de-actuating said clamping means when successive of said apron means completes traverse movement of the articles and starts upward movement through the carriage means to thereby release the successive layers of articles in the carriage means to successive of the apron means, and means for removing successive layers of articles thus transferred to the apron means from said apron means when the latter are moved to said second elevation by said lineal members.

3. A continuous, vertical conveyor mechanism for transferring articles from a first, fixed elevation to selected of a series of second elevations, comprising pairs of endless, flexible lineal members arranged for travel in closed, vertical loops between said first and said series of second elevations with portions of said lineal members movable in vertical, parallel planes with one another from said first elevation relatively toward said second elevations and other portions of said members movable in coincident planes with one another from said second elevations to said first elevation, apron means connected and suspended between said pairs of lineal members for supporting articles during transfer movement and including side support members having a series of linkages interconnected with one another for one-way pivotal movement and oriented to permit the apron means to reside in a rigid, horizontal position normally of the lineal members in the vertical, parallel portions of their travel while at the same time permitting folding movement of the apron means during transition of the lineal members from movement in vertical, parallel planes to movement in coincident planes, vertically movable carriage means disposed in the vertical travel path of the lineal members for varying according to the desired delivery elevation of the articles being transferred at any particular time the elevational position at which the lineal members terminate travel in vertical, parallel planes and commence movement in coincident planes, means for loading articles onto said apron means at the elevational position at which the lineal members commence movement in vertical, parallel planes, and means for unloading articles from the apron means at the elevational position at which the lineal members terminate travel in vertical, parallel planes, said means including a brush-off member carried by said carriage means and disposed to engage and prevent movement of articles on said apron means when the latter is at the elevational position at which the lineal members terminate travel in vertical, parallel planes.

4. Apparatus for transferring articles from a first elevation into stacked relation on a receiver platform at a second elevation, comprising pairs of endless, flexible lineal members arranged for travel in closed, vertical loops extending from said first elevation to said second elevation with portions of said lineal members movable in vertical, parallel planes with one another from a position adjacent said first elevation relatively toward said second elevation and with other portions of said members movable in coincident planes with one another in returning from said second elevation to said first elevation, one-way foldable apron means connected between said pairs of lineal members and adapted to be disposed in a horizontal, rigid position normally of said lineal members when the latter are moving in vertical, parallel planes with one another and in a folded position between and in the same plane as the lineal members when the latter are moving in coincident planes with one another, vertically movable carriage means associated with said pairs of lineal members and having means therein for changing the lineal members from movement in vertical, parallel planes to movement in coincident planes at given, selected elevational positions with respect to said receiver platform and for concurrently therewith causing at least one pair of said lineal members to traverse the receiver platform at such selected elevational positions relatively thereto whereby to cause a correspondingly traversing action of the apron means relatively of the receiver platform, means for loading articles onto said apron means as the same are moved into a horizontal, rigid position between said lineal members at said first elevation, means for transferring articles from said apron means to the receiver platform as said apron means are caused to traverse said platform by the lineal members and which includes a stripper member carried by said carriage means and engageable with the articles on said apron means during traversing movement of the latter with respect to the receiver platform, said carriage means initially positioned immediately above the receiver platform and movable upwardly therefrom in predetermined increments as successive apron means traverse the receiver platform whereby to cause successive groups of articles to be deposited on the receiver platform in layered relationship to one another, and means for driving said lineal members for continuous, unidirectional travel in the apparatus.

5. Apparatus according to claim 4 wherein the carriage means includes opposed, parallel support surfaces engageable by the apron means as the latter traverses the receiver platform to aid in maintaining the apron means in a rigid horizontal position during traverse of the receiver platform.

6. Apparatus for transferring articles from a first elevation into stacked relation on a receiver platform at a second elevation, comprising pairs of endless, flexible lineal members arranged for travel in closed, vertical loops extending from said first elevation to said second elevation, with portions of said lineal members movable in vertical, parallel planes with one another from a position adjacent said first elevation relatively toward said second elevation and with other portions of said members movable in coincident planes with one another in returning from said second elevation to said first elevation, one-way foldable apron means connected between said pairs of lineal members and adapted to be disposed in a horizontal, rigid position normally of said lineal members when the latter are moving in vertical, parallel planes with one another and in a folded position between and in the same plane as the lineal members when the latter are moving in coincident planes with one another, vertically movable carriage means associated with said pairs of lineal members and having means therein for changing the lineal members from movement in vertical, parallel planes to movement in coincident planes at given, selected elevational positions with respect to said receiver platform and for concurrently therewith causing at least one pair of said lineal members to traverse the receiver platform at such selected elevational positions relatively thereto whereby to cause a correspondingly traversing action of the apron means relatively of the receiver platform, means for loading articles onto said apron means as the same are moved into a horizontal, rigid position between said lineal members at said first elevation, means for transferring articles from said apron means to the receiver platform as said apron means are caused to traverse said platform by the lineal members and which includes a stripper member carried by said carriage means and engageable with the articles on said apron means during traversing movement of the latter with respect to the receiver platform to wipe the articles onto said platform as said apron means traverses the same, said apron means including rotatable means for support of the articles thereon to facilitate the transfer of the articles from the apron means to the platform by said stripper member, said carriage means initially positioned immediately above the receiver platform and movable upwardly therefrom in predetermined increments as successive apron means traverse the receiver platform whereby to cause successive groups of articles to be deposited on the receiver platform in layered relationship to one another, and means for driving said lineal members for continuous, unidirectional travel in the apparatus.

References Cited

UNITED STATES PATENTS

| | | | |
|---|---|---|---|
| 3,024,891 | 3/1962 | Sawrie | 198—154 |
| 3,184,039 | 5/1965 | Czarnecki | 198—154 |
| 3,223,260 | 12/1965 | Bright | 198—154 X |
| 3,268,061 | 8/1966 | De Good et al. | 198—154 X |

GERALD M. FORLENZA, Primary Examiner

R. J. SPAR, Assistant Examiner

U.S. Cl. X.R,

198—154; 214—8,5